June 7, 1966  R. M. LEIRVIK  3,255,090
FUEL PIN SPACERS
Filed Aug. 23, 1962  2 Sheets-Sheet 1
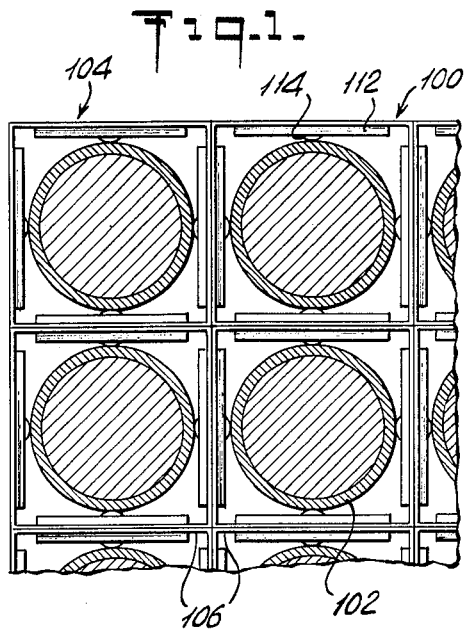
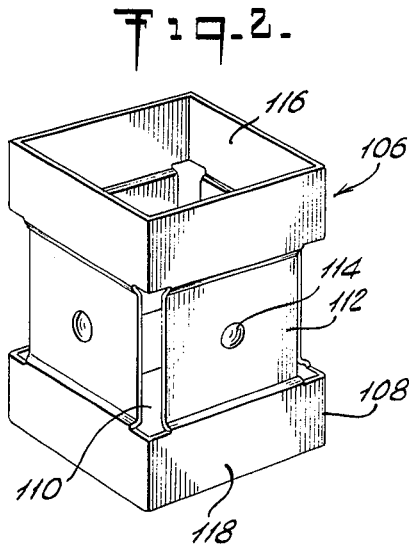
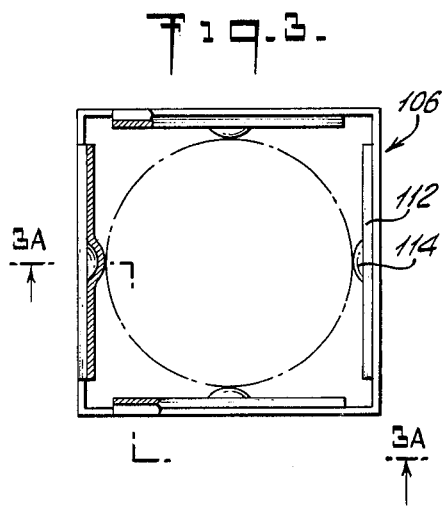
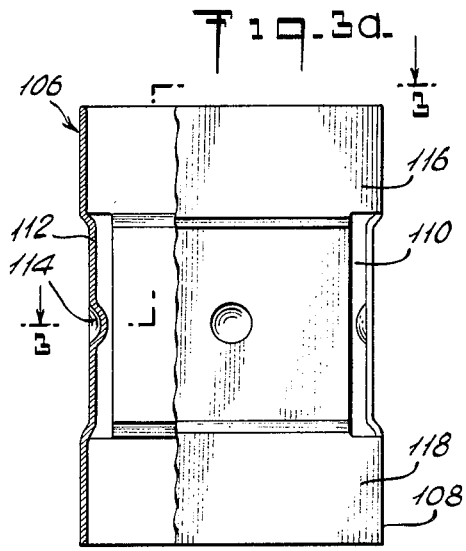
INVENTOR.
RAYMOND M. LEIRVIK
BY
ATTORNEY

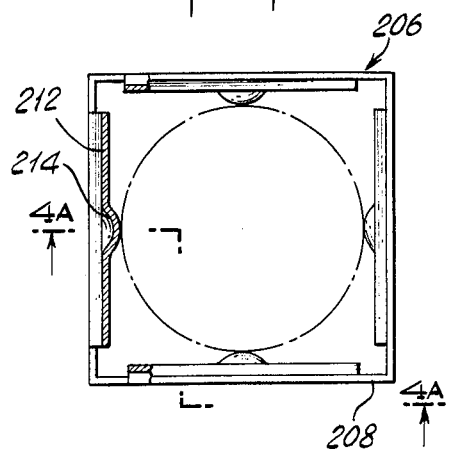
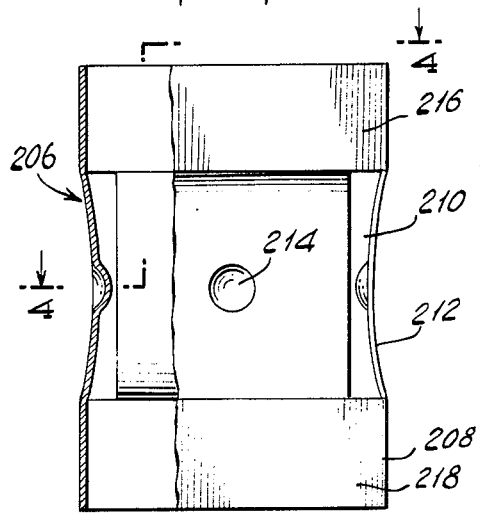
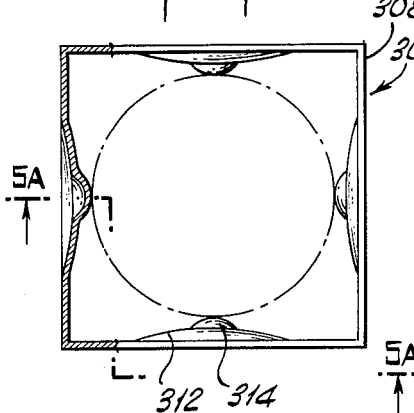
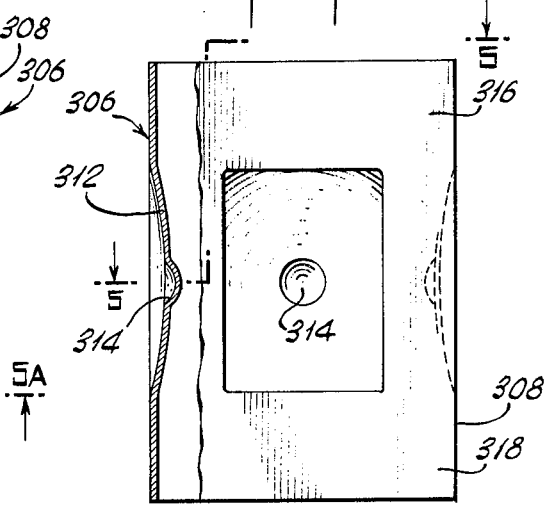
INVENTOR.
RAYMOND M. LEIRVIK

United States Patent Office

3,255,090
Patented June 7, 1966

3,255,090
FUEL PIN SPACERS
Raymond M. Leirvik, Lynchburg, Va., assignor to The Babcock & Wilcox Company, New York, N.Y., a corporation of New Jersey
Filed Aug. 23, 1962, Ser. No. 219,043
7 Claims. (Cl. 176—76)

The present invention relates in general to fuel element assemblies for a nuclear reactor, and more particularly, to apparatus for spacing fuel pins within a fuel element assembly.

In the design of nuclear power plants one of the primary considerations is the arrangement of fuel within the reactor core. The fuel must be arranged so that optimum power may be obtained from the core. To achieve optimum power several factors concerning the disposition of the fuel in the core must be considered. One of these factors is the shape of the fuel containing component, which must be such that a high surface to volume ratio prevails permitting maximum efficiency in the removal of heat is generates. One of the preferred shapes of fuel containing components is the fuel pin or rod in which the nuclear fuel is disposed within a relatively thin-walled circular tube of cladding material. Fuel pins, however, are generally quite long in comparison with their diameter and because of their slender construction the means for spacing and positioning the fuel pins within the fuel element assembly is another factor requiring consideration. In regard to spacing the fuel pins still another factor which must be noted is that of cumulative tolerances in assembling the fuel pins into a fuel element. The fuel element's transverse dimensions must be kept within close limits and in turn the individual fuel pins and spacers must not contribute to excessive cumulative tolerances.

In a fuel element assembly it is important that the spacers for the fuel pins have the following features: (1) good mechanical stability, (2) minimum areas of contact between the spacers and the fuel pins to afford maximum heat removal and to avoid the development of hot spots because of inadequate cooling, (3) minimum obstruction to coolant flow so that the pressure drop of the coolant through the core is kept to a minimum, and (4) simplicity of design for ease in the fabrication of the fuel pins into a bundle or fuel element assembly.

It is the primary object of the present invention to provide a resilient spacing arrangement for the fuel components in a fuel element assembly. In the past there has been a considerable variety of fuel component spacers used in the fuel element art. Generally these spacers have been formed in a rigid construction so that they do not deflect when they are in contact with the fuel components. Aditionally, the spacers are bonded or otherwise secured to the fuel components in a manner which restrains movement rather than permitting it. In comparison, however, the present invention affords a spacer which deflects to accommodate and resiliently secure the fuel components in position and does not inhibit any differential movement of the fuel components and spacers within the fuel element assembly.

In the present invention a short tube section is disposed concentrically about each of the fuel components. The walls of the tube section are formed with a compound indentation which has been graphically described as a pimpled dimple. Initially, the walls are indented inwardly toward but out of contact with the component it surrounds, this is the dimple portion. Then a relatively small surface of the initial indentation is indented further inwardly so that it contacts the surface of the component and forms the dimpled portion of the dimple. By forming at least three of these indented surfaces at equally spaced positions about the spacer a resilient holding means is provided for the component.

In addition to indenting the surface of the spacer its corners are partially cut away or slotted. This slotting of the corners permits improved and independent deflection characteristics for the individual indented wall surfaces of the spacer.

The various features of novelty which characterize this invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Of the drawings:
FIG. 1 is a partial sectional view of a fuel element assembly illustrating one embodiment of the present invention;
FIG. 2 is an enlarged perspective view of one of the spacers shown in FIG. 1;
FIG. 3 is a top view, partially in section, of the spacer shown in FIG. 2 and taken along line 3—3 of FIG. 3A;
FIG. 3A is a side view partially in section taken along line 3A—3A of FIG. 3;
FIG. 4 is a top view, partially in section, taken along line 4—4 of FIG. 4A and showing another embodiment of the spacer arrangement in the present invention;
FIG. 4A is a side view, partially in section, taken along line 4A—4A of FIG. 4;
FIG. 5 is a top view, partially in section, taken along line 5—5 of FIG. 5A and illustrating still another embodiment of the spacer arrangement in the present invention;
FIG. 5A is a side view, partially in section, taken along line 5A—5— of FIG. 5.

Corresponding elements in the various embodiments described herein and illustrated in the drawings have similar reference numerals which are distinguished by different first numbers.

In FIG. 1 there is shown a portion of a transverse section through a fuel element assembly 100 comprising a plurality of fuel components 102 of the pin or rod type arranged in a regular geometric array and spaced from one another by means of a spacer grid 104 made up of a number of individual spacer tube sections 106. In the fuel element assembly 100 there would be a number of spacer grids 104 arranged at intermediate positions along the length of the assembly; a typical spacing of the grids would be on 12-inch centers.

As shown in FIGS. 2, 3 and 3A the spacer tube 106 is formed from a short section of square tubing 108. The four corners of the spacer tube 106 are cut away for a portion of their mid-length to provide slots 110. Coextensive with the slots the mid-portions of the walls of the tube are intended inwardly into a flat surface 112 so that for its height the indented portion provides a cross section of uniform area. At the center of each of these indented flat surfaces 112 there is a further spherical indentation 114, which has been earlier described as a pimpled portion or surface. As shown in FIG. 1, the indentations 114 form a point contact with the fuel components 102 at spaced positions disposed 90° apart.

End or unindented surfaces of the tube sections 116 and 118, respectively, contact the corresponding surfaces on the adjacent spacer tube sections 106 so that the spacer tubes fit together to form a grid arrangement. The individual tube sections may be joined together in a number of ways, as for example by brazing the contacting surfaces, by spot welding along the top and bottom edges of the tube sections or by banding them together with a strap around the peripheral tube sections of the grid.

In FIGS. 4 and 4A there is shown another embodiment of the spacer tube 206 similar in corner slots 210 and sections 216, 218 to the spacer tube 106 shown in FIG. 2. The difference between these two spacer tubes is in the shape of the indented surfaces between the ends 216 and 218. In spacer tube 206, the mid-portions of the walls are indented inwardly forming a curved surface 212 as can be noted in FIG. 4A, and distinguished from the flat indented surface 112 of spacer tube 106. The surface 212 is curved when viewed in a transverse plane but not when viewed in a longitudinal plane. The additional spherical indentation 214 is the same as shown in FIG. 3.

In FIGS. 5 and 5A there is shown a third embodiment of a spacer tube section 306 which employs the same general compound indentation as exhibited in spacer tubes 106 and 206. The difference in tube spacer 306 is that its corners are not slotted, and the indented surfaces 312 are curved with respect to both the longitudinal and transverse axes of the spacer tube, though the spherical indentation 314 remains the same. Though the indented surfaces of tube spacers 106 and 206 enclose an area of constant cross section throughout their height the indented surfaces 312 and 314 provide a cross-sectional area which varies through the height of the surfaces.

For each embodiment the pimpled portions of the indented surfaces, which contact the fuel components, are located equidistant from one another. While all of the embodiments disclose a square tube, it would be possible to use a rounded tube section or some other multisided section other than a sqaure. Further, it is possible that other than circular shapes could be used for the fuel components and the spacer tubes indented to conform to these other shapes.

While the spacer tubes in the various figures show the indented surfaces disposed 90° apart about the fuel component, it would be possible to use less than four indentations and still provide adequate means for holding the fuel components. Additionally, depending on the shape of the spacer tubes and the configuration of the fuel components, more than four indented surfaces may be used to properly position the fuel components. Though it is preferred that all of the indented surfaces have the pimpled dimple construction, it would be possible to use a combination of surfaces having the double indentations with others which only have the pimpled indentation.

The important feature of the spacer tube is its ability to provide a resilient holding means for the fuel components. Particularly in spacer tubes 106 and 206 where each corner is slotted, each wall is capable of independent deflection and spring action. Because of this independent action each wall can adjust to the range of tolerances of the outside diameter of the fuel components without affecting the adjacent indented wall surfaces. In addition, the ability of the indented surfaces to deflect overcomes any problems which might arise due to the build-up of cumulative tolerance variations. Any tolerance variations in the diameter or transverse dimensions of the fuel components are absorbed by the deflection of the indented surfaces of their spacer tubes. In this way tolerance variations of the fuel components are not permitted to build-up and affect the over-all dimensions of the fuel element assembly. Another advantage is that the cost of the fuel components can be reduced because a broader range of tolerances can be used for the cladding of the fuel components.

Another problem which the spacer tubes of the present invention helps to overcome is that of vibration. Due to the elongation of the fuel components as compared to their cross-sectional area when coolant flows over them, they tend to vibrate. This vibration may cause excessive wear between the fuel components and the spacers which could result in a rupture of the cladding or collapse of a spacer. However, with the fuel components securely and resiliently held in place by the compound indentations of the spacer tubes the fuel components will not vibrate in the region of the spacers.

A further advantage of the tube spacers is that they can be made of relatively thin material, as little as ten mils thick, and, therefore, afford very little obstruction to flow of the coolant through the fuel element assembly. In the same vein the point contact formed between the pimpled dimple indentations and the fuel components offers small interference with coolant flow and avoids, as much as possible, the development of hot spots at this place of contact.

In view of these numerous advantages the present invention provides a highly effective spacer construction which may be simply and inexpensively constructed.

While in accordance with the provisions of the statutes the invention has been illustrated and described in the best form and mode of operation of the invention now known, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. A spacer arrangement for a fuel element comprising:
   (A) a plurality of fuel components arranged in a regular array,
   (B) a multisided tube section concentrically disposed about each of said fuel components,
      (1) said sections arranged in side-by-side relationship and joined together forming a spacer grid,
      (2) each of the sides of said sections having a first portion indented inwardly toward but spaced from said components,
      (3) each of the first portions of said sides having a second portion of relatively small area compared with that of the first portion indented inwardly into contacting relationship with said components whereby the double indentations provide resilient contacting surfaces which hold said components in position laterally, and
      (4) the sides of said tube sections having slots formed therein for improving the resilient action of the indented first and second portions.

2. A spacer arrangement for a fuel element comprising:
   (A) a plurality of pin type fuel components arranged in a uniform array,
   (B) a short square tube section concentrically disposed about each of said fuel components,
      (1) said sections arranged in side-by-side relationship and joined together forming a spacer grid,
      (2) each of the sides of said sections having a first portion indented inwardly toward but spaced from said components,
      (3) each of the first portions of said sides having a second portion of relatively small area indented inwardly into contacting relationship with said components whereby the double indentations provide resilient contacting surfaces which hold said components in position laterally while permitting unrestrained axial movement of the components, and
      (4) each corner of said tube sections having a slot formed therein.

3. A spacer arrangement for a fuel element comprising:
   (A) a plurality of elongated pin type fuel components arranged in a uniform geometric array,
   (B) a short square tube section concentrically disposed about each of said fuel components,
      (1) said sections arranged in side-by-side contacting relationship and joined together forming a spacer grid,
      (2) each of the sides of said sections having a centrally disposed first portion indented inwardly toward but in spaced relationship from the component it encircles,
(3) each of the first portions of said sides having a centrally disposed second portion of relatively small area indented inwardly into contacting relationship with said components whereby the double indentations provide resilient contacting surfaces which hold said components in position laterally while permitting unrestrained axial movement of the components, and
(4) each of the corners of said sections having a slot formed therein so that the sides act individually of one another.

4. A fuel element assembly comprising:
(A) a plurality of elongated pin type fuel components arranged in a uniform geometric array,
(B) a number of spacer grids disposed at intervals along the length of said assembly and comprising
(1) a multiplicity of short square tube sections each concentrically disposed about one of said components,
(2) said tube sections arranged in side-by-side contacting relationship and joined together for forming said grid,
(3) each of the corners of said sections slotted for an intermediate portion of the length of the section,
(4) each of the sides of said sections having a centrally located first portion indented inwardly toward but in spaced relationship from the component it encircles, and
(5) each of the first portions of said sides having a centrally disposed second portion of relatively small area indented inwardly into contacting relationship with said components whereby the combination of the slotted corners and the double indentations provide resilient contacting surfaces which hold said components in position laterally while permitting unrestrained axial movement of the components 5. A spacer arrangement for a fuel element comprising:
(A) a plurality of fuel components disposed in a regular array,
(B) a multisided tube section disposed about each of said fuel components,
(1) said tube sections arranged in contiguous relationship and forming a spacer grid,
(2) first indented portions of at least three of the sides of said tube section indented inwardly toward but disposed at an interval from said component,
(3) a second indented portion formed in each of said first indented portions, said second indented portion formed from a relatively small part of said first indented portion and indented inwardly into contact with said component forming a resilient holding means therefor.

6. A spacer arrangement for positioning fuel components in a fuel element comprising,
A. a tube section arranged about each of said fuel components,
B. at least three spaced first portions of the surface of each of said tube sections indented inwardly toward but disposed at an interval from the fuel component said tube section encircles,
C. a second portion in each of said first portions indented inwardly into contact with the fuel component said tube section encircles forming a resilient holding means therefor, and
D. said tube sections joined together to space the fuel components in a regular array within the fuel element.

7. A spacer arrangement for a fuel element comprising:
A. a plurality of fuel components disposed in a regular array,
B. a multisided tube section disposed about each of said fuel components,
C. at least three spaced first portions of said tube section indented inwardly toward but disposed at an interval from said fuel component,
D. a second portion formed in each of said first portions and indented inwardly into contact with the fuel component forming a resilient holding means therefor, and
E. said tube sections joined together in contiguous relationship forming a spacer grid for said fuel components.

References Cited by the Examiner

UNITED STATES PATENTS

| 1,343,002 | 6/1920 | Markert | 229—39 |
| 3,068,163 | 12/1962 | Currier et al. | 176—78 |

FOREIGN PATENTS

| 1,259,772 | 3/1961 | France. |
| 1,087,285 | 8/1960 | Germany. |
| 1,093,500 | 11/1960 | Germany. |
| 365,078 | 1/1932 | Great Britain. |
| 883,030 | 11/1961 | Great Britain. |

REUBEN EPSTEIN, *Primary Examiner.*

CARL D. QUARFORTH, *Examiner.*

R. C. LYNE, R. L. GRUDZIECKI, *Assistant Examiners.*